(12) United States Patent
Koepke

(10) Patent No.: US 8,761,718 B2
(45) Date of Patent: Jun. 24, 2014

(54) VERIFICATION OF COMMUNICATIONS NETWORK-DERIVED LOCATION INFORMATION

(75) Inventor: Michael Arthur Koepke, Geneva, IL (US)

(73) Assignee: West Corporation, Omaha, NE (US)

( * ) Notice: Subject to any disclaimer, the term of this patent is extended or adjusted under 35 U.S.C. 154(b) by 1029 days.

(21) Appl. No.: 11/564,923

(22) Filed: Nov. 30, 2006

(65) Prior Publication Data

US 2008/0132197 A1    Jun. 5, 2008

(51) Int. Cl.
| | |
|---|---|
| H04W 24/00 | (2009.01) |
| G06F 15/16 | (2006.01) |
| H04M 11/04 | (2006.01) |
| H04W 4/22 | (2009.01) |
| H04W 4/02 | (2009.01) |
| H04W 40/20 | (2009.01) |

(52) U.S. Cl.
CPC *H04W 4/22* (2013.01); *H04W 4/02* (2013.01); *H04W 40/20* (2013.01)
USPC .............. 455/404.2; 455/456.3; 709/206; 379/45

(58) Field of Classification Search
CPC . H04W 4/22; H04W 76/007; H04W 28/0026; H04W 40/20
USPC .......... 455/404.1, 404.2, 435.2, 414.2, 456.3; 379/45, 49, 10.01; 340/539.13; 370/351; 342/357.22; 709/206
See application file for complete search history.

(56) References Cited

U.S. PATENT DOCUMENTS

| | | | | |
|---|---|---|---|---|
| 5,235,633 | A  * | 8/1993 | Dennison et al. | .......... 455/456.3 |
| 6,202,023 | B1 * | 3/2001 | Hancock et al. | .............. 701/201 |
| 7,133,498 | B2 | 11/2006 | Cacioppo et al. | |
| 7,420,963 | B1 * | 9/2008 | Shankar et al. | ............... 370/352 |
| 2001/0017598 | A1 | 8/2001 | Townsend et al. | |
| 2003/0063714 | A1 * | 4/2003 | Stumer et al. | ................... 379/37 |
| 2003/0086538 | A1 * | 5/2003 | Geck et al. | ...................... 379/45 |
| 2004/0021573 | A1 * | 2/2004 | Hoffman et al. | ........... 340/573.1 |
| 2004/0192346 | A1 * | 9/2004 | Chang et al. | ............... 455/456.1 |
| 2004/0203927 | A1 | 10/2004 | Kraft | |
| 2005/0003797 | A1 * | 1/2005 | Baldwin | .................... 455/404.1 |
| 2005/0037775 | A1 * | 2/2005 | Moeglein et al. | .......... 455/456.1 |
| 2005/0137994 | A1 | 6/2005 | Fortin et al. | |

(Continued)

FOREIGN PATENT DOCUMENTS

| | | |
|---|---|---|
| EP | 1280119 A1 | 1/2003 |
| JP | 2006157474 A | 6/2006 |
| WO | WO0013336 | 3/2000 |

OTHER PUBLICATIONS

Synthetic Transaction Configuration—Chapter 6.*

*Primary Examiner* — Nizar Sivji

(57) ABSTRACT

A system and method that tests emergency services location information and provides virtually instantaneous feed-back to a technician in the field, monitoring center or both. A location of a mobile communications device is determined by the technician via independent means and a call is placed to a special test number. When an element in the mobile network receives the call, it recognizes the special number and obtains location information regarding the mobile communications device by the means currently employed in the art for emergency services calls. The location information is delivered back to the calling mobile communications device, where it is compared to the previously-determined location. The two locations may then be stored on the mobile communications device, forwarded to a monitoring center or both.

4 Claims, 7 Drawing Sheets

(56) References Cited

U.S. PATENT DOCUMENTS

| | | |
|---|---|---|
| 2005/0144294 A1 | 6/2005 | Gellens et al. |
| 2005/0206566 A1* | 9/2005 | Stilp et al. .................... 342/455 |
| 2006/0105789 A1 | 5/2006 | Amit |
| 2006/0109960 A1* | 5/2006 | D'Evelyn et al. ............... 379/37 |
| 2006/0189327 A1 | 8/2006 | Zellner et al. |
| 2006/0223494 A1* | 10/2006 | Chmaytelli et al. ........ 455/404.2 |
| 2006/0235926 A1 | 10/2006 | Naruse |
| 2006/0245570 A1* | 11/2006 | Pfleging et al. .......... 379/211.02 |
| 2006/0293024 A1* | 12/2006 | Benco et al. ............... 455/404.2 |
| 2007/0111703 A1* | 5/2007 | Holland et al. ............ 455/404.2 |
| 2008/0125077 A1* | 5/2008 | Velazquez et al. ......... 455/404.2 |

* cited by examiner

VERIFICATION OF COMMUNICATIONS NETWORK-DERIVED LOCATION INFORMATION

BACKGROUND OF THE INVENTION

The present invention is directed to verification of communications network-derived location information, and, more specifically, to a system and method that tests network-derived location information regarding a mobile communications device (such as a wireless communications device, Voice over Internet Protocol (VoIP) communications device, etc.) relative to the actual location of the mobile communications device for location-based services. This invention is particularly relevant to testing network-derived emergency services (i.e., 9-1-1) location information regarding a mobile communications device.

When abbreviated emergency services dialing ("9-1-1" in the U.S. and Canada) was first introduced, the emergency services operator had to ask the caller for a call-back telephone number and the location that the caller was calling from, among other information regarding the nature of the emergency. If the caller was unable to communicate this basic information to the operator, (because, for example, the caller was injured or did not speak the language), then help could not be dispatched.

To alleviate this problem, enhanced 9-1-1 (E9-1-1) was developed. In E9-1-1, the telephone number of the calling telephone is delivered with the call to the local public safety answering point (PSAP). The PSAP queries a regional Automatic Location Information (ALI) database using the calling telephone number as a key. The ALI database returns a record containing the street address and, in some cases, other information associated with the calling telephone number. The operator at the PSAP that takes the call is then presented with the calling telephone number and the street address associated with the calling telephone number. Such information aids the operator to call the telephone back in case the call is cut off for any reason and aids the operator in guiding help to the location of the caller.

To provide E9-1-1 capabilities for landline telephone subscriber in the current art, the physical address of the subscriber and the call-back number of the telephone are manually provisioned in the appropriate ALI database. In most cases, the incumbent local exchange carrier (ILEC) or competitive local exchange carrier (CLEC) track all landline telephone number changes and either report them to a clearing house that maintains the ALI database or updates the appropriate ALI database themselves.

The above-described system works very well in landline-based telephony, because telephone number and address are relatively fixed, changes occur slowly over time and changes occur in a manner easily tracked by the ILEC's or CLEC's. Wireless communications devices, however, do not have a fixed location by definition. Various governmental mandates now require that, when a wireless communications device makes an emergency services (e.g., 9-1-1) call, the wireless communications service provider must deliver the calling number (for call-back purposes) and at least a general location. In the United States, the government mandate requires implementation in two phases. Phase I implementation requires that the wireless communications network identify the cell site, cell sector, or both, that are handling the call. For phase II, The street address and, preferably, the actual location (i.e., the latitude and longitude, also called herein "X/Y coordinates") of the calling wireless communications device must be delivered.

VoIP telephony is another communications technology that is not compatible with the above-described landline emergency services paradigm. VoIP communications devices may be plugged into a data network at a first location one day and then plugged in at a second location the next. Furthermore, some VoIP communications devices are wireless, that is; these VoIP communications devices connect to a data network at an access point via radio signals. The United States Government mandates that the location (again, at minimum street address and optionally latitude and longitude) of VoIP communications devices also be delivered. Wireless and VoIP communications devices are referred to herein as "mobile communications devices."

Additionally, the United States government requires that wireless communications service providers periodically test the location system to verify that the location of a calling mobile communications device is being accurately determined and is in compliance with 9-1-1 emergency call mandates. Such verification currently involves one or more field technicians making a plurality of calls to a special number and recording the location from which the call was made using an independent location reference device (such as a global positioning system device). The location of the calling mobile communications device is determined and recorded by the communications network. The technician and/or other service personnel then manually compare the two lists and determine whether accurate location information is being determined. However, the location of the mobile communications device derived by the communications network is not readily available to the technician until sometime later, when the technician has access to the locations recorded by the communications network.

A problem in the art is that the current manual method of testing location information is time intensive and therefore costly. Additionally, if any errors occur when the wireless communications system determines the location of the wireless communications device, these errors cannot be detected until later and result in repeated testing.

SUMMARY OF THE INVENTION

This problem is solved and a technical advance is achieved in the art by a method that provides virtually instantaneous feedback to a technician in the field, technician monitoring testing or both. In accordance with one aspect of this invention, a location of a mobile communications device is determined by independent means, such as a global positioning system (GPS) device or a map (which may include identifications of cell sites that serve locations on the map). A call is placed to a special number, which is preferably not an emergency services number (i.e., not 9-1-1). When a mobile switching center (MSC) receives the call, it recognizes the special number and obtains location information from a positioning center (e.g., a mobile positioning center (MPC) or a gateway mobile location center (GMLC)), regarding the wireless communications device by the means currently employed by the MSC for emergency services calls. The location information may comprise the cell site ID, the sector of the cell site, the X/Y coordinates of the calling communications device, the serving public safety answering point (PSAP) ID, or some combination thereof. The location information is delivered back to the calling mobile communications device, where it is compared to the previously-determined location.

Advantageously, such communication is effected using one or more short message service (SMS) messages sent to the technician's mobile communications device. The two locations may then be stored on the wireless communications device, forwarded to a monitoring center, stored in a separate storage system (e.g., a laptop computer, a personal digital assistant, etc.) or any combination thereof. In accordance with one aspect of this invention, the mobile communications device comprises a wireless communications device (e.g., a "cell phone," a wireless laptop, etc.). In accordance with another aspect of this invention, the mobile communications device comprises a VoIP communications device (e.g., a VoIP telephone, a dual-mode cell phone, etc.).

According to another aspect of this invention, once the positioning center determines the location of the wireless communications device, the location is forwarded to a monitoring center. The location of the mobile device is also forwarded to the monitoring center by the field technician. The monitoring center may comprise a test results database accessible by the field technician. Advantageously, the monitoring center may comprise a web site accessible by the technician in the field via, for example, the wireless communications device, a laptop, or any device with data communications capability. In this manner, the location of a wireless communications device as determined in accordance with emergency services procedures may be compared to the actual location is real or near-real time. Adjustments may then be made in order to increase the accuracy of the emergency services procedures.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
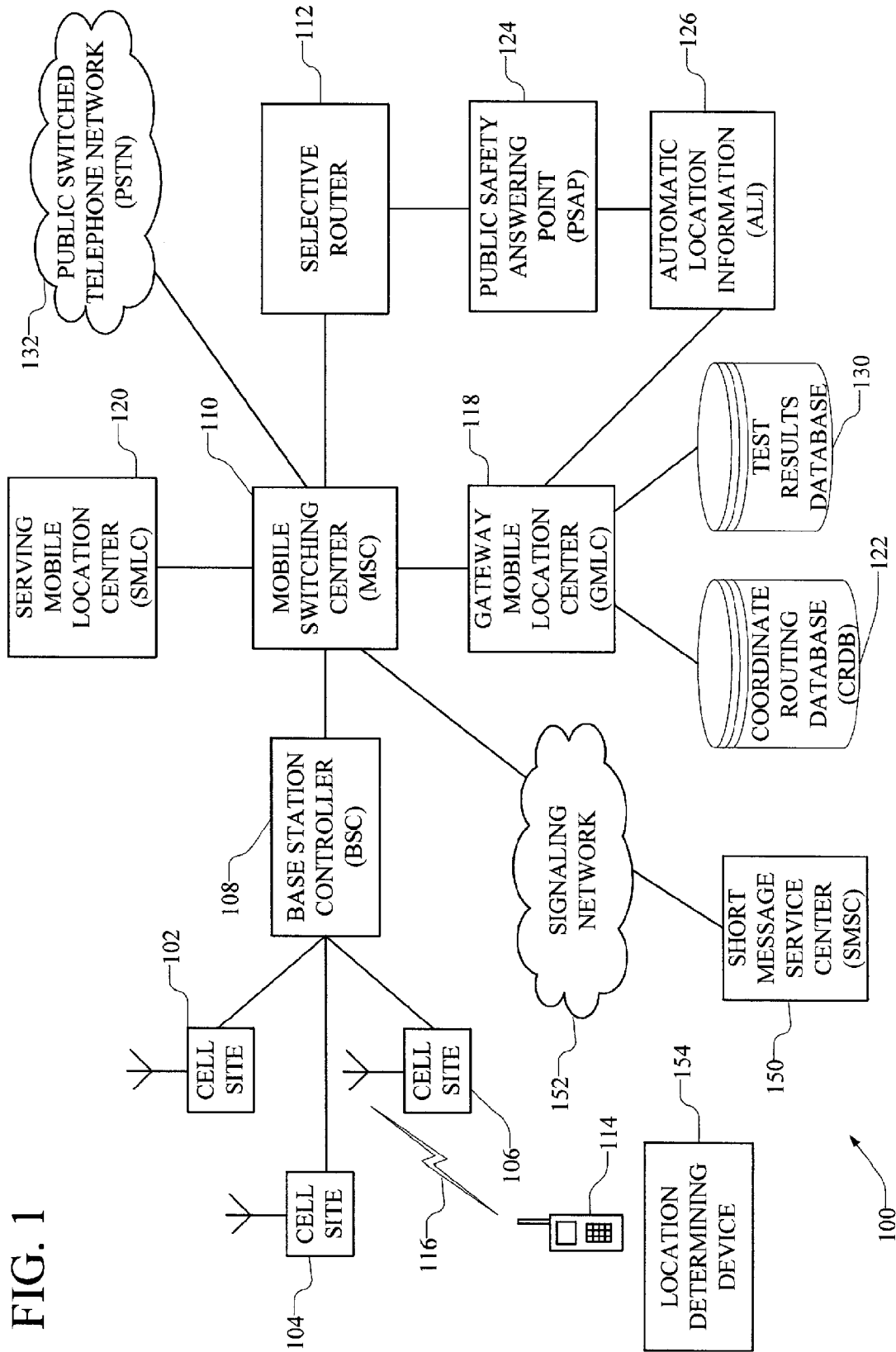
FIG. 1 is a block diagram of a wireless communications network in which a first embodiment of the present invention operates.

FIG. 1 illustrates a wireless communications network 100 in which a first exemplary embodiment of this invention operates. Wireless communications network 100 comprises a network operating in accordance with GSM standards as is known in the art. Thus, wireless communications network 100 comprises a plurality of cell sites, represented by cell sites 102, 104 and 106. The plurality of cell sites is connected to a plurality of base station controllers, represented by base station controller (BSC) 108. All BSC's, including BSC 108, are connected to a GSM mobile switching center (MSC) 110. Cell sites 102, 104 and 106, BSC 108 and MSC 110 are well known in the art and are thus not further described. MSC 110 is connected to a selective router 112 that routes the call to a public safety answering point (PSAP) 124, which are also known in the art and thus not further described.

While this invention is described in terms of a GSM-based wireless communications network, one skilled in the art will understand how to implement this invention in wireless communications networks based on other standards (such as a CDMA network) after studying this specification.

Figure 2:
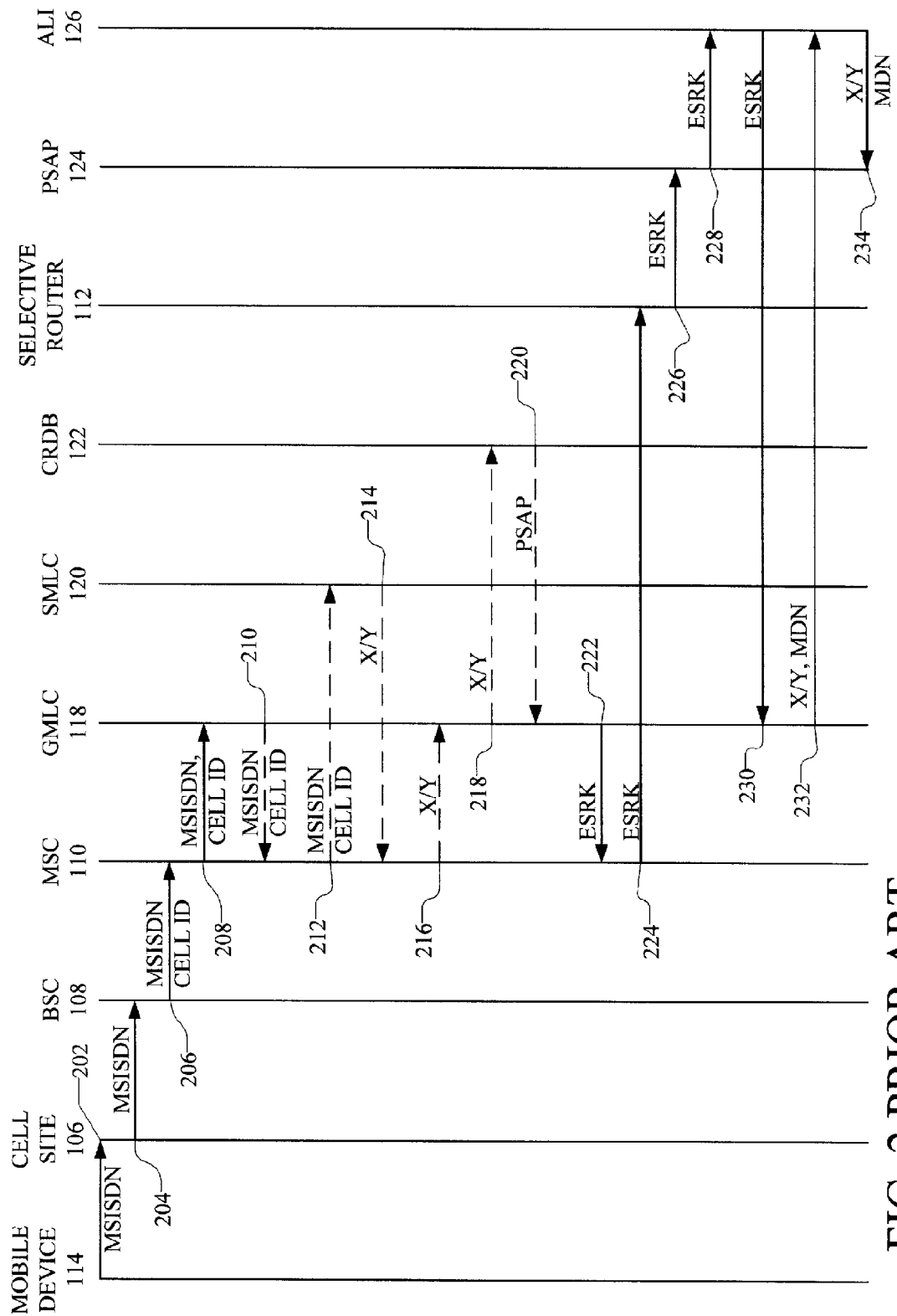
FIG. 2 is a call flow diagram of an emergency services call in accordance with the prior art in the context of FIG. 1.

In order to understand the importance of this invention, handling of a special number call by wireless communications network 100 according to the prior art is now described in the context of the call flow of FIG. 2. Each step in the call flow of FIG. 2 is indicated in parenthesis after the description of that step in FIG. 1.

The user of mobile communications device 114 enters an emergency services number and presses send. For purposes of describing this invention, the emergency services number is 9-1-1, the North American emergency services number. Mobile unit 114 sends a call origination message, including the dialed number (9-1-1) and the identity of mobile unit 114 to a serving cell site, which, in this exemplary embodiment, is cell site 106, over a radio interface, represented by communications channel 116. (202) The identity of a mobile unit is usually the mobile subscriber integrated services digital network number (MSISDN), but may also be the international mobile subscriber identity (IMSI) or the mobile directory number (MDN). For purposes of describing this invention, MSISDN is used to indicate MSISDN, MDN, IMSI or any other indicia that uniquely identifies the mobile unit to the wireless communications network.

Cell site 106 forwards the call to BSC 108, including the dialed number and the MSISDN. (204) BSC 108 forwards the call with the dialed number, the MSISDN and the serving cell site ID to MSC 110. (206) MSC 110 recognizes the emergency services number (the dialed number) and initiates its location determination procedure. To this end, MSC 110 sends a query to gateway mobile location center (GMLC) 118 to determine how to route the call, passing it the MSISDN and an identification of serving cell site 106. (208) In accordance with Phase I wireless emergency services, GMLC 118 applies the identification of serving cell site 106 to a table and selects a serving public safety answering point (PSAP) 124 that serves the location proximal to the cell site. Processing skips steps 210, 212, 214, 216, 218, and 220 (which are shown in FIG. 2 in phantom for that reason) and proceeds directly to step 222 (described below).

In accordance with Phase II wireless emergency services, GMLC 118 sends the MSISDN and the cell site identification to serving mobile location center (SMLC) 120 via MSC 110. (210, 212) SMLC 120 determines the X and Y coordinates of calling mobile unit 114 and returns the X/Y coordinates back to GMLC 118 via MSC 110. (214, 216) GMLC 118 applies the X/Y coordinates to a coordinate routing database (CRDB) 122. (218) CRDB 122 comprises at least a mapping of geographical locations served by wireless communications system 100 to a serving public safety answering point (PSAP).

In this exemplary embodiment, PSAP 124 serves the location around cell site 106. GMLC 118 receives a PSAP ID from CRDB 122. (220) GMLC determines an emergency services routing key (ESRK) and delivers the ESRK to MSC 110. (222) MSC 110 delivers the call to selective router 112 with 9-1-1 as the called number and the ESRK as the calling number. (224) Selective router 112 uses the ESRK select a PSAP from the plurality of PSAP's to which it is connected, which, in this exemplary embodiment is PSAP 124, and delivers the call to PSAP 124 passing the ESRK as the calling number. (226)

PSAP 124 queries automatic location information (ALI) database 126 using the ESRK as a key. (228) ALI 126 recognizes the ESRK as a special number requiring further information and queries GMLC 118 with the ESRK. (230) GMLC 118 delivers the location information and the MSISDN of mobile unit 114 back to ALI 126 (232), which, in turn, delivers the location information and MSISDN to PSAP 124. (234)

From the above description, it is clear that a system to test the accuracy of GMLC 118, SMLC 120 and CRDB 122 is required so that emergency services calls do not have to be rerouted from one PSAP to another if a determination is made by a PSAP operator that mobile communications device 114 is actually in a location served by another PSAP. As described above, the prior art method for testing is for mobile communications device 114 to place a call to a test number. MSC 110 recognizes the test number and performs the above-described steps 208-216 or 222. GMLC 118 stores the test results in test results database 130. The call is completed to some predetermined destination in the public switched telephone network (PSTN) 132 or the call is terminated. The technician using mobile communications device 114 logs the time and the location from which the call was made. The technician's log is then manually compared to the records in test results database 130 and any discrepancies are noted.

In accordance with this invention, and in contradistinction to the prior art, the test results are delivered to the technician in the field as the test is in progress. In this manner, discrepancies are more quickly and easily determined and corrected; thus saving time and, in the case of 9-1-1 routing, improving emergency services.

Figure 3:
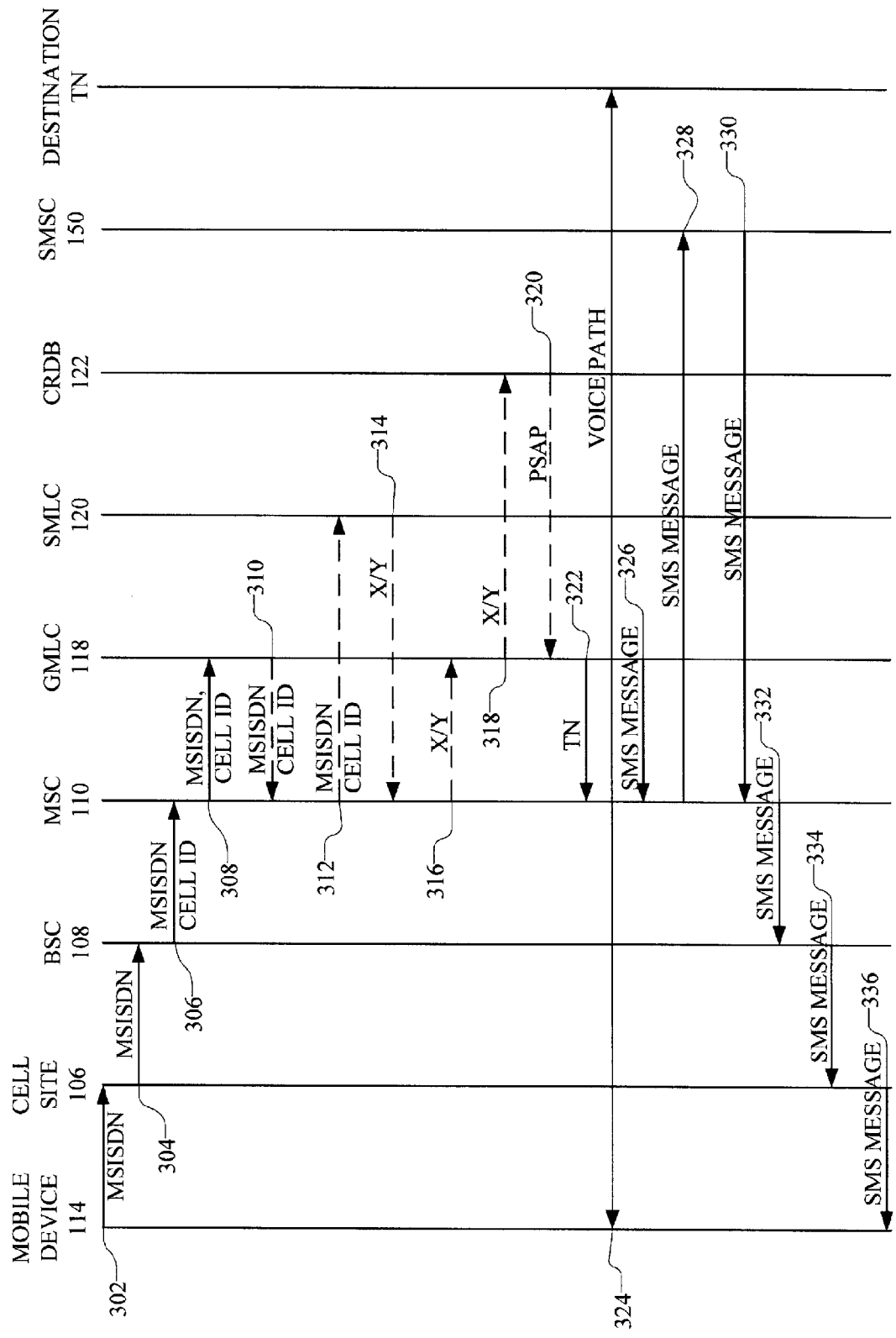
FIG. 3 is a call flow diagram of a special number test call in the context of FIG. 1.

Such beneficial results are achieved by GMLC 118 sending a short message service (SMS) message containing the test results (that is, X/Y coordinates) via short message service center (SMSC) 150 back to mobile communications device 114, either instead of recording the results in test results database 130 or supplemental thereto. An exemplary embodiment of this invention is now described in the call flow of FIG. 3 taken in the context of FIG. 1. Call flow steps from FIG. 3 appear in parenthesis after the step described.

The technician determines his or her current location using a location determining device, such as, but not limited to, a global positioning system (GPS) device, a map of the area being tested (which may include the location of cell sites 102, 104 and 106) or both. Such location determination may take place before, during or after making the test call. Location determining device 154 may comprise a stand-alone device, may be incorporated into mobile communications device 114 or may advantageously be a combination device, such as a laptop computer, that can make wireless calls, determine location and record results. Advantageously, mobile communications device 114, location determining device 154, or both, are SMS-enabled devices.

In accordance with this embodiment of this invention, the technician using mobile communications device 114 makes an emergency services test call by entering the emergency services test number, such as 9-2-2, and sending a call setup signal to the serving cell site, which in this exemplary embodiment is cell site 106. Mobile communications device 114 delivers it MSISDN to cell site 106. (302) An emergency services test number that is not the same as the emergency service number is preferred so that the test call does not use valuable emergency services resources. Cell site 106 forwards the call to BSC 108, delivering the dialed number (9-2-2) and an identification of mobile communications device 114, which generally comprises the MSISDN of the device. (304)

BSC 108 forwards the call to MSC 110, passing the dialed number, MSISDN, cell site ID and, optionally, the sector of the cell site. (306) MSC 110 recognizes the emergency services test number and sends an outgoing ISUP IAM or an SLR message (an ESRK request) to GMLC 118. The outgoing message includes the MSISDN of mobile communications device 114. (308) If wireless communications network 100 is operating in a phase I mode, steps 310, 312, 314, 316, 318 and 320 are skipped and processing continues directly to step 324. GMLC 118 applies the identification of serving cell site 106 and, optionally, the sector to a table and selects a serving public safety answering point (PSAP) 124 that serves the location proximal to the cell site.

If wireless communications network 100 is operating in phase II mode, GMLC 118 delivers a PSL message to MSC 110, passing the MSISDN and cell ID (310), which MSC 110 forwards to SMLC 120. (312) SMLC 120 determines the X/Y coordinates of mobile communications device 114 and returns the derived X/Y coordinates to MSC 110. (314) MSC 110 forwards the X/Y coordinates to GMLC 118. (316)

GMLC 118 queries CRDB 122 with the X/Y coordinates. (318) CRDB 122 returns a PSAP ID to GMLC 118. (320) GMLC 118 selects a non-PSAP telephone number (such as time and temperature or weather) and returns it to MSC 110. (322) MSC 110 completes a call path to the destination telephone number. (324) In accordance with this invention and in contradistinction to the prior art, GMLC 118 sends a SMS message, which includes the MSISDN, Cell ID, X/Y coordinates, PSAP ID, or any combination thereof. (326)

MSC 110 sends the SMS message to SMSC 150. (328) SMSC 150 locates mobile communications device 114 in the manner known in the art, and send the short message back to MSC 110. (330) MSC 110 handles this message as it would any short message, and delivers the message to BSC 108 (332), which forwards it to cell site 106. (334) Cell site 106 delivers the short message to mobile communications device 114. (336)

At this point, the technician has both the location as personally determined and the location as determined by wireless communications network 100. In this manner, the technician has sufficient location information to determine whether wireless communications network 100 adequately determines the location at which the technician is currently located.

In accordance with this invention, therefore, the technician has at least the cell site ID (for phase I systems), which can be compared to a cell site map, other information that the technician has regarding local cell sites and cell site coverage, or both. Preferably, the technician also has the network-determined X/Y coordinates and can compare these to the technician's independent location determination. In addition, the technician may have a PSAP ID that can be compared to an emergency services zone map to determine whether the identified PSAP actually serves the emergency services zone in which the technician made the test call. Thus, this exemplary embodiment provides a technician with more information more quickly than the prior art, which aids wireless communications service provider in providing accurate emergency services.

In the above-described exemplary embodiment, GMLC 118 sends an SMS message to SMS server 150 in steps 326 and 328. This embodiment advantageously uses the SMS message system with only minor modifications to GMLC 118. In an alternative exemplary embodiment, GMLC 118 may format and send an SMS message directly back to mobile communications device 114. While this alternative exemplary embodiment requires more modifications to GMLC 118, it provides information back to mobile communications device more rapidly and thus may be more desirable when, for example, the mobile communications device is moving.

Further, the above-described exemplary embodiment is described in terms of a call being made from mobile communications device 114 and receiving an SMS message in return. One skilled in the art will realize that an SMS message may be used to initiate location testing. In this exemplary embodiment, the technician enters an SMS test message and sends the message to a test number. The MSC 110 recognizes the test number and performs location determination as described above. Optionally MSC 110 forwards the SMS test message to another system, such as GMLC 118, to process the message and perform location determination. The location is then returned back to the technician in another SMS message. In this exemplary embodiment, no voice path resources are used, providing an additional savings in network resources.

Figure 4:
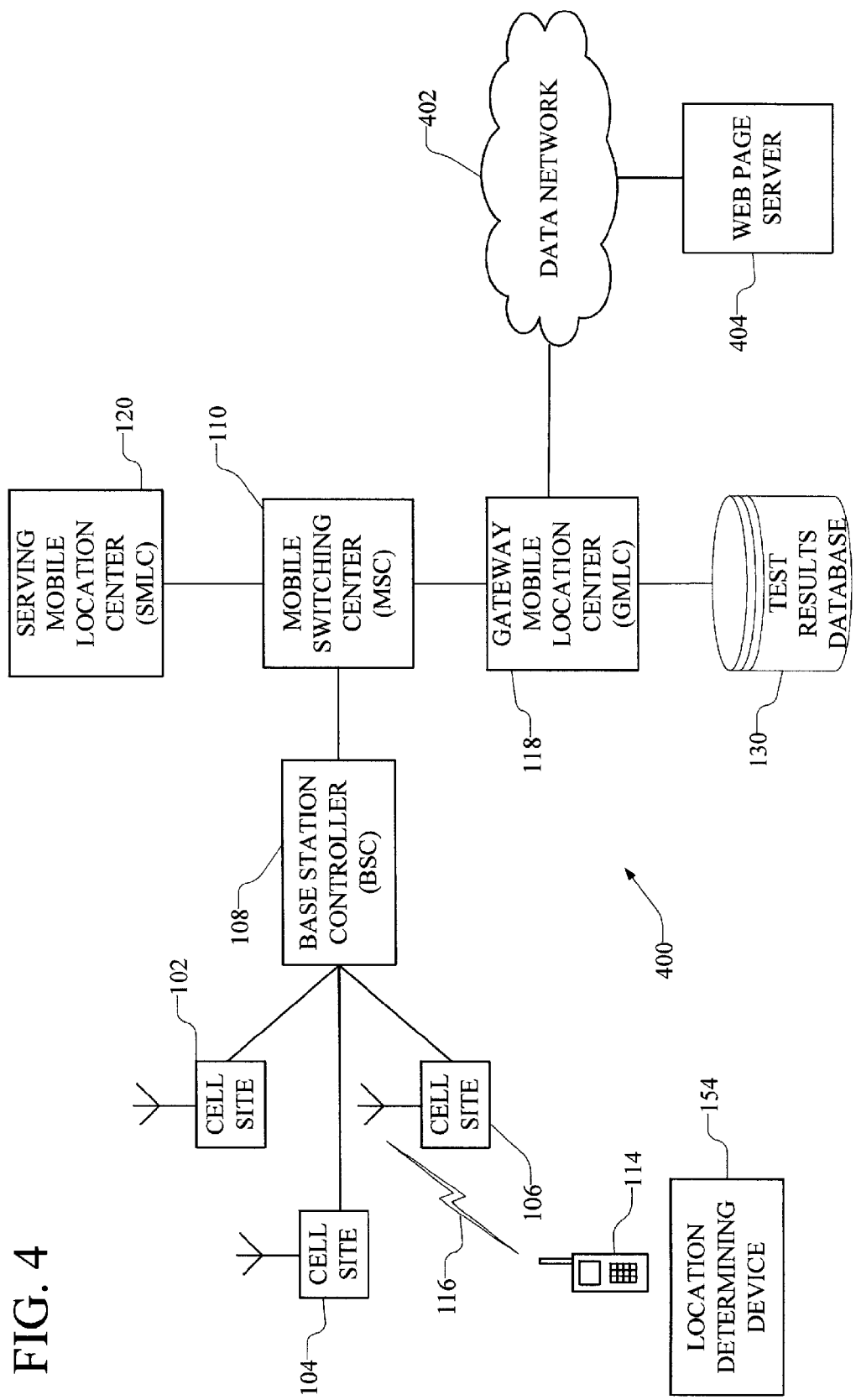
FIG. 4 is a block diagram of a communications network in accordance with a further embodiment of the present invention.

Turning now to FIG. 4, another exemplary embodiment of this invention is shown in the context of communications network 400. The communications network 400 is similar to the communications network 100 of FIG. 1. In accordance with this embodiment of this invention, however, GMLC 118 is connected to a data network 402. A web page server 404 is also connected to data network 402. Data network 402 may be a public data network, such as the Internet, may be a private data network or may be a signaling network, such as signaling network 152 (FIG. 1).

Figure 5:
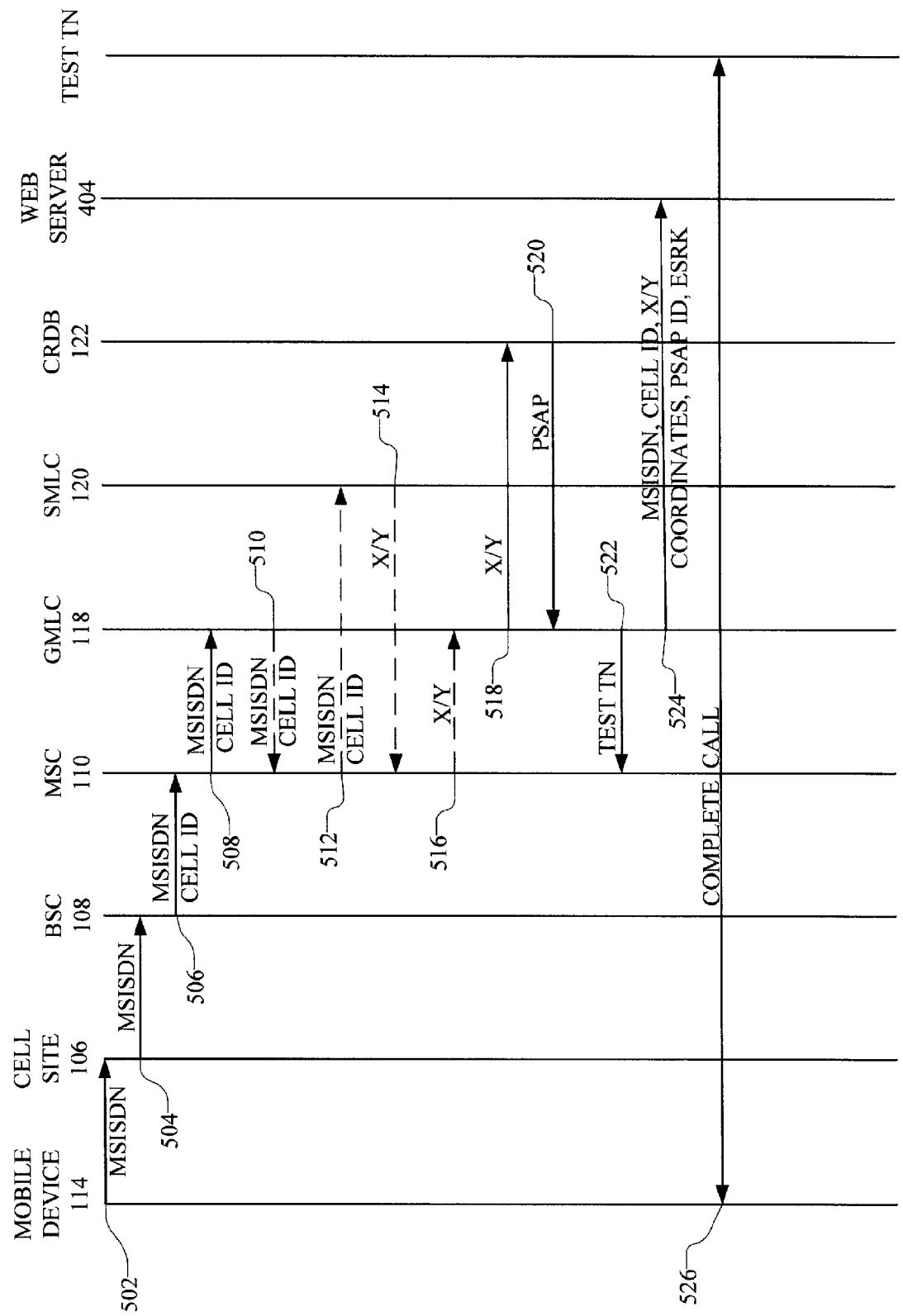
FIG. 5 is a call flow diagram of a special number test call in the context of FIG. 4.

An emergency services location test call is now described in the context of FIG. 4 taken in conjunction with the call flow of FIG. 5. In this exemplary embodiment, the technician makes an emergency services location test call on mobile communications device 114 by entering the emergency services test call number, such as 9-2-2, and sending a call setup signal to cell site 106, which includes its MSISDN. (502) Cell site 106 forwards the call through BSC 108 (504) to MSC 110, which delivers the dialed number (9-2-2), the cell site ID of cell site 106 and the MSISDN of mobile communications device 114. (506)

MSC 110 recognizes the emergency services test number and delivers the MSISDN and cell ID to GMLC 118. (508) Again, if wireless communications network 400 is a phase I network, processing skips steps 510, 512, 514, 516, 518 and 520 and proceeds directly to step 522. If wireless communications network 400 is a phase II network, GMLC 118 sends the MSISDN and cell ID to MSC (510) for delivery to SMLC 120 (512). SMLC 120 performs location determination of mobile communications device 114 and delivers X/Y coordinates for the MDN back to MSC 110 (514), which forwards them to GMLC 118. (516) GMLC 118 applies the identification of serving cell site 106 to a table and selects a serving public safety answering point (PSAP) 124 that serves the location proximal to the cell site.

When GMLC 118 has the X/Y coordinates, it assigns a test TN. In accordance with this exemplary embodiment, GMLC 118 forwards the MSISDN, cell ID, X/Y coordinates, PSAP ID or any combination thereof to web server 404 over data network 402. (524) Advantageously, MSC 110 delivers the call to the test TN (a non-PSAP location, such as time and temperature). (526) The technician can then manually or automatically up load the location information to web page server 404 determined in situ in any manner known in the art.

Figure 6:
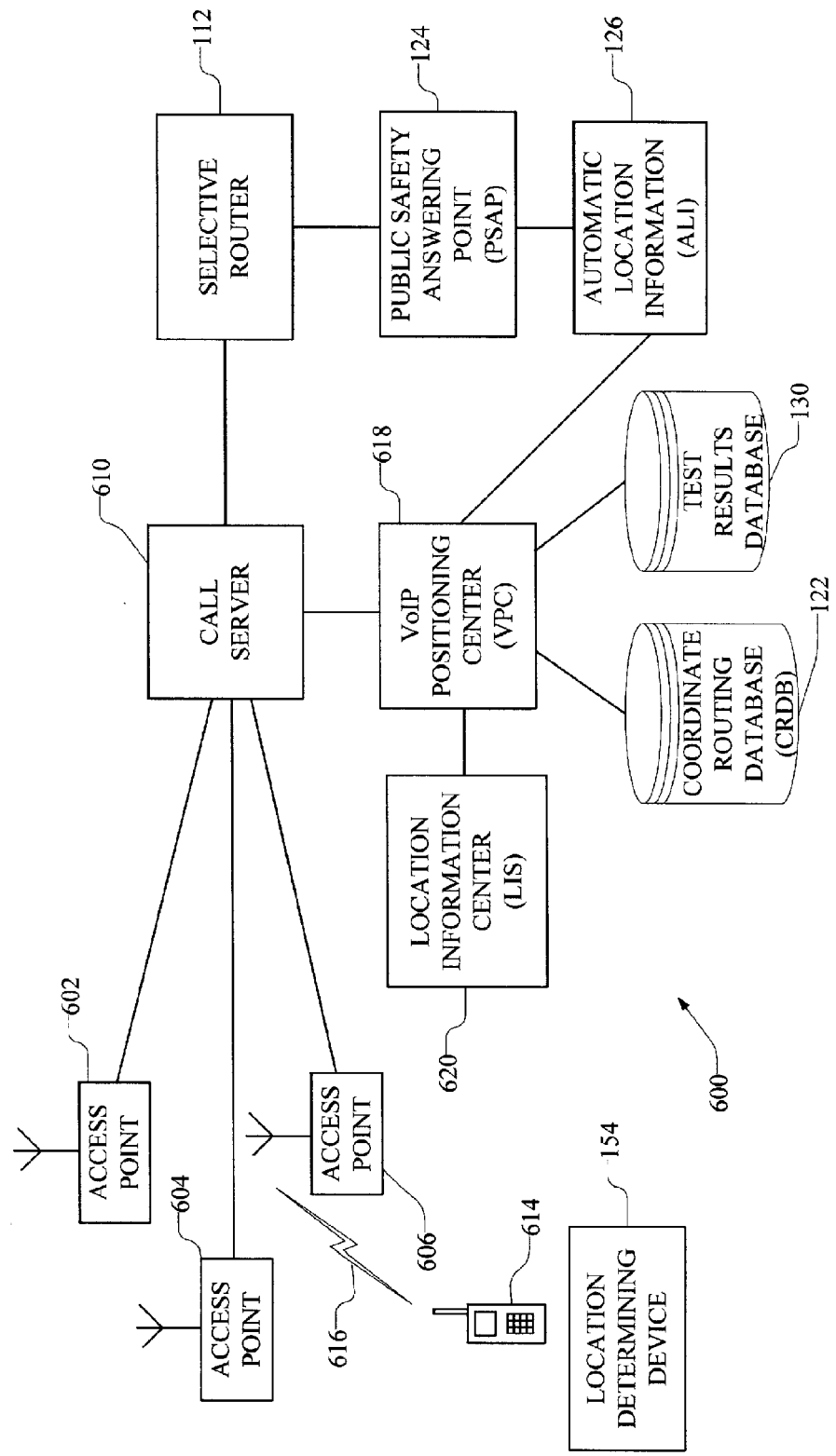
FIG. 6 is a block diagram of a communications network in accordance with another further embodiment of this invention.

Turning now to FIG. 6, another alternative embodiment of this invention is shown, in the context of communications network 600. Communications network 600 comprises a VoIP communication network in this exemplary embodiment. As such, there are a plurality of access points, represented by access point 602, access point 604 and access point 606. All access points 602, 604 and 606 are connected, either directly or indirectly, to a call server 610. For purposes of clarity in this figure, access points 602, 604 and 606 are shown directly connected to call server 610. One skilled in the art will understand that there may be one or more data networks between and among access points 602, 604 and 606 and call server 610.

For purposes of describing this exemplary embodiment, VoIP mobile communications device 614 is in radio communications 616 with access point 606, via, for example, Wi-Fi. Call server 610 routes emergency services calls by querying VoIP positioning center (VPC) 618, which queries location information center (LIS) 620, as will be described further, below, in order to locate a calling VoIP mobile communications device, such as VoIP mobile communications device 614 and route the call to a serving PSAP. Call server 610 is connected directly or indirectly to one or more selective routers, represented by selective router 112, which connects emergency services calls to one or more PSAP's, represented by PSAP 124. PSAP 124 queries ALI 126 for location information, which, in turn, obtains location information from VPC 618.

Figure 7:
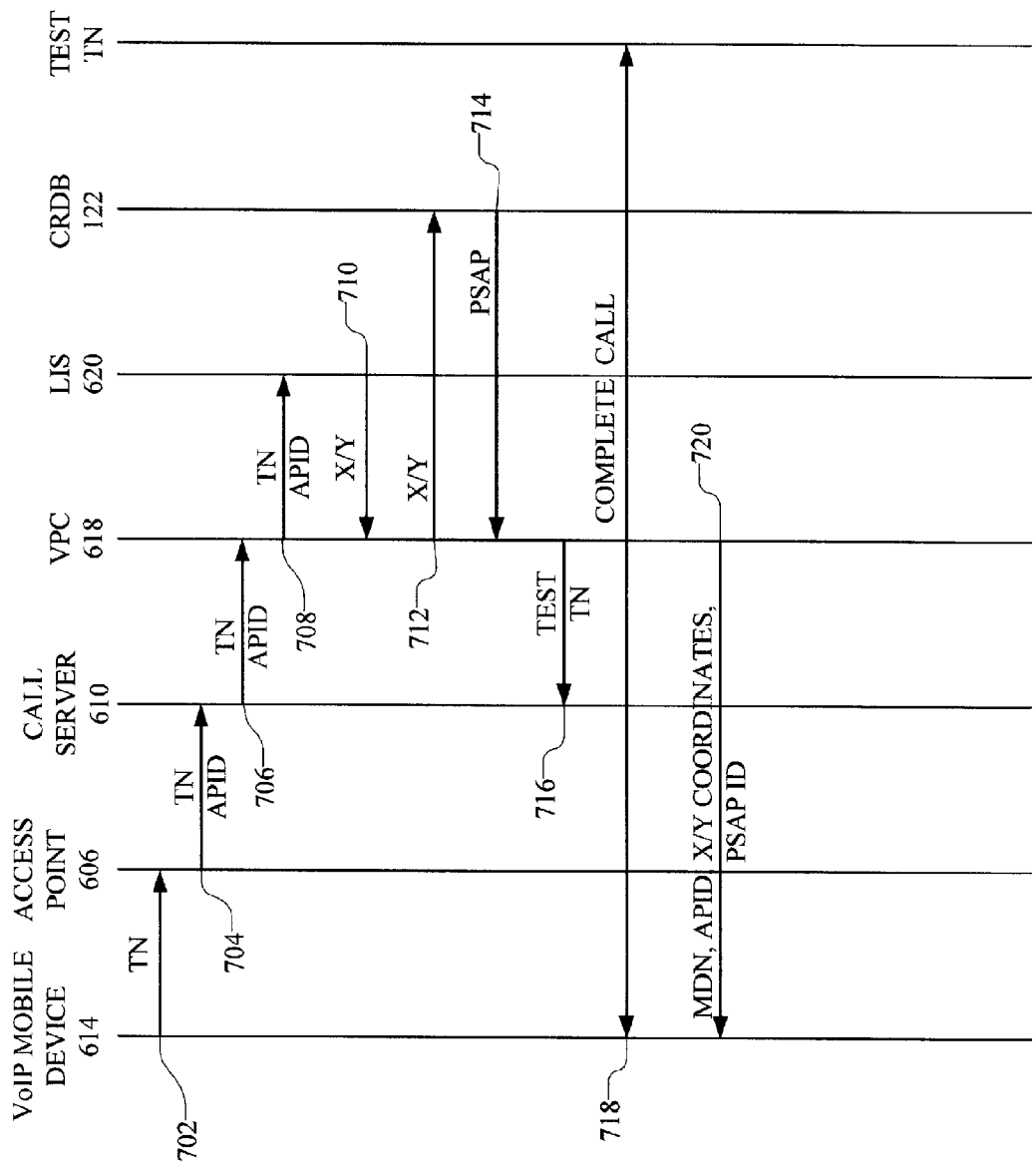
FIG. 7 is a call flow diagram of a special number test call in the context of FIG. 6.

An emergency services location test call is now described in the context of FIG. 6 taken in conjunction with the call flow of FIG. 7. As described above, the technician makes an independent determination of location before, during or after making the test call. In this exemplary embodiment, the technician makes an emergency services location test call on VoIP mobile communications device 614 by entering the emergency services test call number (again, preferably not 9-1-1) and sending a call setup signal including its telephone number (TN) to access point 606. (702) Access point 606 forwards the call to call server 610 and includes the TN and its access point identification (APID). (704)

Call server 610 recognizes the emergency services test call number and forwards the TN and APID to VPC 618. (706) VPC 618 determines that a location of the access point is needed, and forwards the TN and APID to LIS 620. (708) LIS 620 determines the X/Y coordinates of access point 606 and returns them to VPC 618. (710) VPC 618 queries CRDB 122 with the X/Y coordinates (712), which returns a PSAP identification. (714)

Because this is a test call, VPC 618 delivers a test TN to call server 610. (716) Call server 610 causes the call to be completed between VoIP mobile communications device 614 and the test TN. (718) VPC 618 then delivers the TN, APID, X/Y coordinates, PSAP ID, or an combination thereof back to VoIP mobile communications device 614. (720) The technician now has sufficient information to determine the accuracy of communications network 600 ability to located VoIP mobile communications device 614.

While this embodiment is described in terms of wireless VoIP, one skilled in the art will understand how to modify this embodiment to wired network VoIP after studying this specification.

It is to be understood that the above-described embodiment is merely illustrative of the principles of the present invention and that many variations of the above-described embodiments can be devised by one skilled in the art without departing from the scope of the above-described invention. It is therefore intended that such variations be included within the scope of the following claims and their equivalents.

The invention claimed is:

1. A method for testing accuracy of mobile communications network derived emergency services geographic location information comprising:
 determining a first geographic location of a mobile communications device by a first geographic location determining means;

making a call by a user to an emergency services test number; said emergency services test number being other than an emergency services number;

determining a second geographic location of said mobile communications device by the mobile communications network using a second geographic location determining means independent of said first geographic location determining means in response to said making a call to said emergency services test number; and delivering the second geographic location of said mobile communications device to said user at said mobile communications device to permit said user to make a comparison of said first geographic location and said second geographic location to effect said testing, wherein delivering the second geographic location of said mobile communications device to said user at said mobile communications device comprises:

sending a short message service (SMS) message to said mobile communications device from the mobile communications network.

2. A method in accordance with claim 1 wherein sending an SMS message comprises sending an SMS message via normal SMS channels.

3. A method in accordance with claim 1 wherein sending an SMS message comprises sending an SMS message directly to said mobile communications device.

4. A method for testing mobile communications network derived emergency services geographic location information comprising:

determining a first geographic location of a mobile communications device by a first geographic location determining means;

making a call by a user to an emergency services test number; said emergency services test number being other than an emergency services number;

determining a second geographic location of said mobile communications device by the mobile communications network by a second geographic location determining means independent of said first geographic location determining means in response to said making a call to said emergency services test number; and delivering the second geographic location of said mobile communications device to a data server accessible by said user, wherein delivering the second geographic location of said mobile communications device comprises:

completing a connection between said mobile communications device and the data server in response to said making a call to said emergency services test number; and up loading said second geographic location from said mobile communications device to said data server.

* * * * *